United States Patent
Chou et al.

(10) Patent No.: US 10,101,764 B2
(45) Date of Patent: Oct. 16, 2018

(54) AUTOMATIC CLOCK CONFIGURATION SYSTEM

(71) Applicant: Quanta Computer Inc., Taoyuan (TW)

(72) Inventors: Le-Sheng Chou, Taoyuan (TW); Sz-Chin Shih, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 164 days.

(21) Appl. No.: 14/953,975

(22) Filed: Nov. 30, 2015

(65) Prior Publication Data

US 2017/0153660 A1 Jun. 1, 2017

(51) Int. Cl.
  G06F 13/38 (2006.01)
  G06F 13/40 (2006.01)
  G06F 13/42 (2006.01)
  G06F 1/12 (2006.01)

(52) U.S. Cl.
  CPC ............ *G06F 1/12* (2013.01); *G06F 13/4291* (2013.01)

(58) Field of Classification Search
  CPC ........... G06F 13/38; G06F 13/40; G06F 13/42
  See application file for complete search history.

(56) References Cited

U.S. PATENT DOCUMENTS

| | | | |
|---|---|---|---|
| 2001/0005871 A1* | 6/2001 | Shimoda | G06F 1/10 710/305 |
| 2004/0095121 A1 | 5/2004 | Kernahan et al. | |
| 2007/0130377 A1* | 6/2007 | Piwonka | G06F 21/74 710/15 |
| 2010/0064099 A1* | 3/2010 | Nishtala | G11C 5/04 711/105 |
| 2014/0115366 A1* | 4/2014 | Joo | G06F 1/06 713/323 |

FOREIGN PATENT DOCUMENTS

TW 200610341 A 3/2006

OTHER PUBLICATIONS

Taiwanese Office Action for Application No. 105101497, dated Feb. 17, 2017, w/ First Office Action Summary.
Taiwanese Search Report for Application No. 105101497, dated Feb. 17, 2017.

* cited by examiner

*Primary Examiner* — David E Martinez
(74) *Attorney, Agent, or Firm* — Nixon Peabody LLP; Eduardo J. Quiñones

(57) ABSTRACT

A method for automatic clock configurations is performed by a system having a host and a peripheral device. The host indicates on a first general-purpose input/output (GPIO) of a peripheral interface connecting the host and the peripheral device, whether the host supports a first clock configuration. The peripheral device receives from the first GPIO whether the host supports the first clock configuration. The peripheral device selects, in response to the host supporting the first clock configuration, use of a local clock of the peripheral device. The peripheral device selects, in response to the host not supporting the first clock configuration, use of a common clock of the host.

18 Claims, 6 Drawing Sheets

500

510
RECEIVING, FROM A HOST ON A FIRST GENERAL-PURPOSE INPUT/OUTPUT (GPIO) OF A PERIPHERAL INTERFACE CONNECTING THE HOST AND THE PERIPHERAL DEVICE, WHETHER THE HOST SUPPORTS THE FIRST CLOCK CONFIGURATION

520
SELECTING, IN RESPONSE TO THE HOST SUPPORTING THE FIRST CLOCK CONFIGURATION, USE OF A LOCAL CLOCK OF THE PERIPHERAL DEVICE

530
SELECTING, IN RESPONSE TO THE HOST NOT SUPPORTING THE FIRST CLOCK CONFIGURATION, USE OF A COMMON CLOCK OF THE HOST

540
RECEIVING, FROM THE HOST ON A SECOND GPIO OF THE PERIPHERAL INTERFACE, WHETHER THE HOST SUPPORTS A SECOND CLOCK CONFIGURATION

550
SELECTING, IN RESPONSE TO THE HOST SUPPORTING COMMON CLOCK SSC, CLOCK BUFFER BYPASS MODE

560
SELECTING, IN RESPONSE TO THE HOST NOT SUPPORTING COMMON CLOCK SSC, CLOCK BUFFER PHASE-LOCKED LOOP (PLL) MODE

FIG. 5

AUTOMATIC CLOCK CONFIGURATION SYSTEM

FIELD OF INVENTION

This application relates to computer systems, and more particularly to an automatic clock configuration system.

BACKGROUND

Peripheral Component Interconnect Express (PCI Express or PCIe) is a high speed serial computer expansion bus standard use for a wide variety of computer applications. The PCIe implements serial, full duplex, multi-lane, point-to-point interconnect, packet-based, and switch based technology.

A broad selection of commercially available devices supports PCI Express. It's also available in FPGAs and systems-on-a-chip (SoCs), providing designers with flexible solutions for transferring data within their systems. Two of the key advantages of PCI Express are its scalable bandwidth and flexible clocking. For example, a host device and a peripheral device may communicate using PCIe.

Reliable data transmission requires a stable clock reference. A clock signal is a particular type of signal that oscillates between a high and a low state and is utilized like a metronome to coordinate actions of digital circuits. A clock signal is produced by a clock generator. The most common clock signal is in the form of a square wave with a 50% duty cycle, usually with a fixed, constant frequency. Circuits using the clock signal for synchronization may become active at either the rising edge, falling edge, or, in the case of double data rate, both in the rising and in the falling edges of the clock cycle.

The PCI Express base Specification reversion 1.0a standard requires a reference clock for the operation of the bus. The PCIe Card Electromechanical Specification, revision 2.0 standard defines a differential square-wave reference clock of 100 MHz fundamental frequency as a reference clock. Typically, the routing of a reference clock signal is allowed to be electrically long. The route for the clock signal is generally composed of one or more PCIe connectors and line segments. Delivering signals over longer lengths may cause clock distortions and lead to excessive jitter due to electromagnetic interference (EMI), radio-frequency interference (EMI), and/or clock skew. In such events, the bus performance may be deteriorated.

The same clock source must be distributed to every PCI Express device while keeping the clock-to-clock skew to less than 12 ns between devices. This can be a problem with large circuit boards or when crossing a backplane connector to another circuit board.

Common Refclk is the most widely supported architecture among commercially available devices. Common Refclk can support spread-spectrum clocking (SSC), which is useful in reducing electromagnetic interference (EMI).

The Peripheral Component Interconnect Special Interest Group (PCI-SIG) is an electronics industry consortium responsible for specifying the Peripheral Component Interconnect, PCI-X, and PCI Express computer buses. PCI-SIG released the Separate Refclk Independent SSC Architecture (SRIS) as an option for improving the clock signal quality. However, not every host device and not every peripheral device supports SRIS.

SUMMARY

The following presents a simplified summary of one or more implementations in order to provide a basic understanding of present technology. This summary is not an extensive overview of all contemplated implementations of the present technology, and is intended to neither identify key or critical elements of all examples nor delineate the scope of any or all aspects of the present technology. Its sole purpose is to present some concepts of one or more examples in a simplified form as a prelude to the more detailed description that is presented later.

In some implementations, a method for automatic clock configurations is performed by a system having a host and a peripheral device. The host indicates on a first general-purpose input/output (GPIO) of a peripheral interface connecting the host and the peripheral device, whether the host supports a first clock configuration. The peripheral device receives from the first GPIO whether the host supports the first clock configuration. The peripheral device selects, in response to the host supporting the first clock configuration, use of a local clock of the peripheral device. The peripheral device selects, in response to the host not supporting the first clock configuration, use of a common clock of the host.

BRIEF DESCRIPTION OF THE DRAWINGS

These and other sample aspects of the present technology will be described in the detailed description and the appended claims that follow, and in the accompanying drawings, wherein:

FIG. 5 illustrates an example methodology for automatic clock configurations of a peripheral device.

DETAILED DESCRIPTION

The subject disclosure provides an automatic clock configuration system. Various aspects of the present technology are described with reference to the drawings. In the following description, for purposes of explanation, numerous specific details are set forth in order to provide a thorough understanding of one or more aspects. It is evident, however, that the present technology can be practiced without these specific details. In other instances, well-known structures and devices are shown in block diagram form in order to facilitate describing these aspects.

Figure 1:
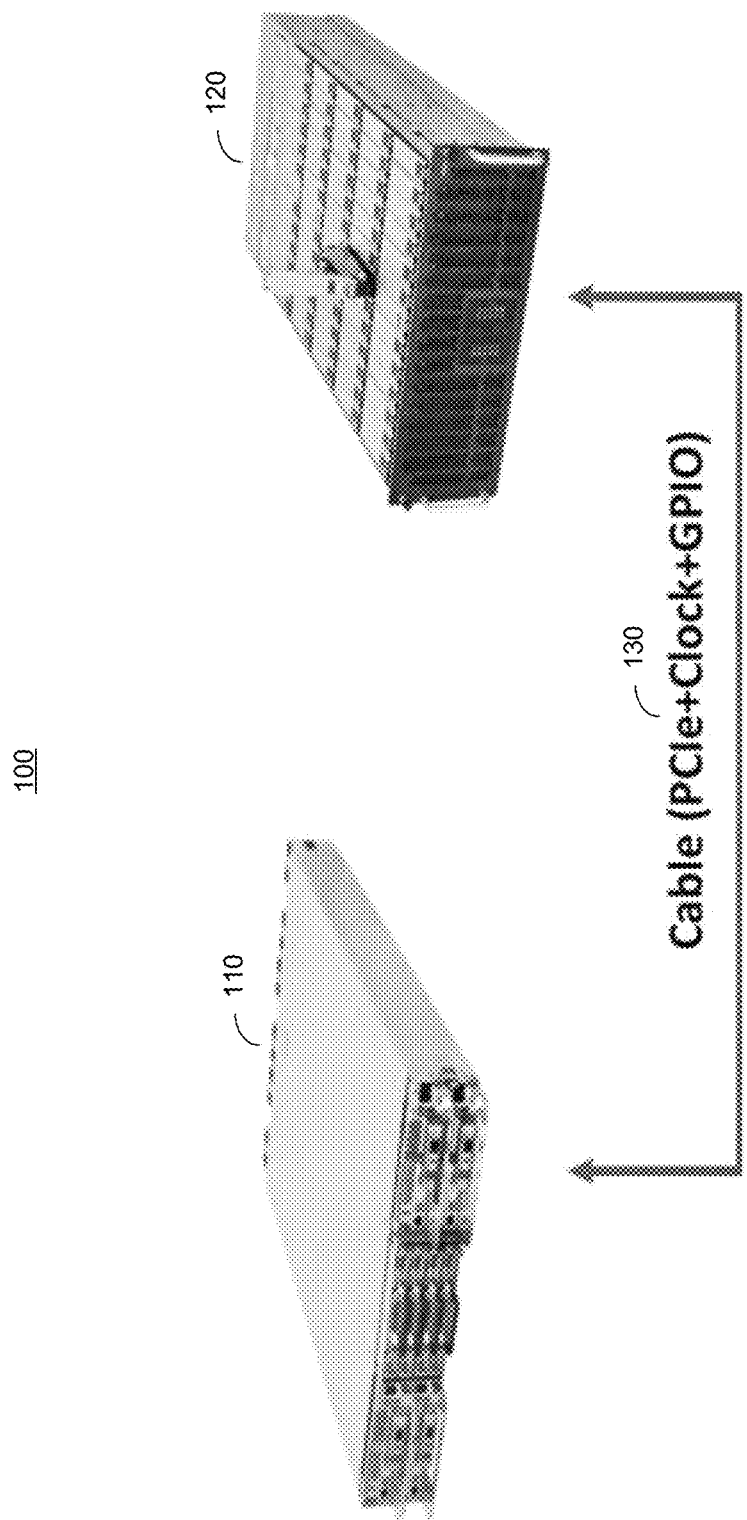
FIG. 1 illustrates an example automatic clock configuration system.

FIG. 1 illustrates an example automatic clock configuration system 100. The automatic clock configuration system 100 includes a host 110 connected to one or more peripheral devices 120 by a cable 130.

The host 110 can refer to a computer system or a host controller (e.g., a PCIe controller) of a computer system. A host controller acts as a bridge to allow connections between a computer system and external or internal computer peripherals. Host controllers are common found as add-in cards which attach to a system through the PCI, PCI-X, or PCI-Express slots built into a motherboard.

The peripheral devices 120 can, for example, be a hard disk drive array, a solid state drive array, or any other peripheral device or group of devices. The peripheral devices 120 can be located in the same computer system as the host 110 or can be located in a same or nearby rack as the host 110.

The cable 130 is configured to allow communication between the host 110 and the peripheral devices 120. For example, the cable 130 can be a Serial Attached Small Computer System Interface (SAS), miniSAS, or mini SAS HD (SFF-8643) cable. The cable 130 is able to carry PCIe data and a reference clock signal. The cable 130 also includes a number of general-purpose input/output (GPIO) pins.

Figure 2:
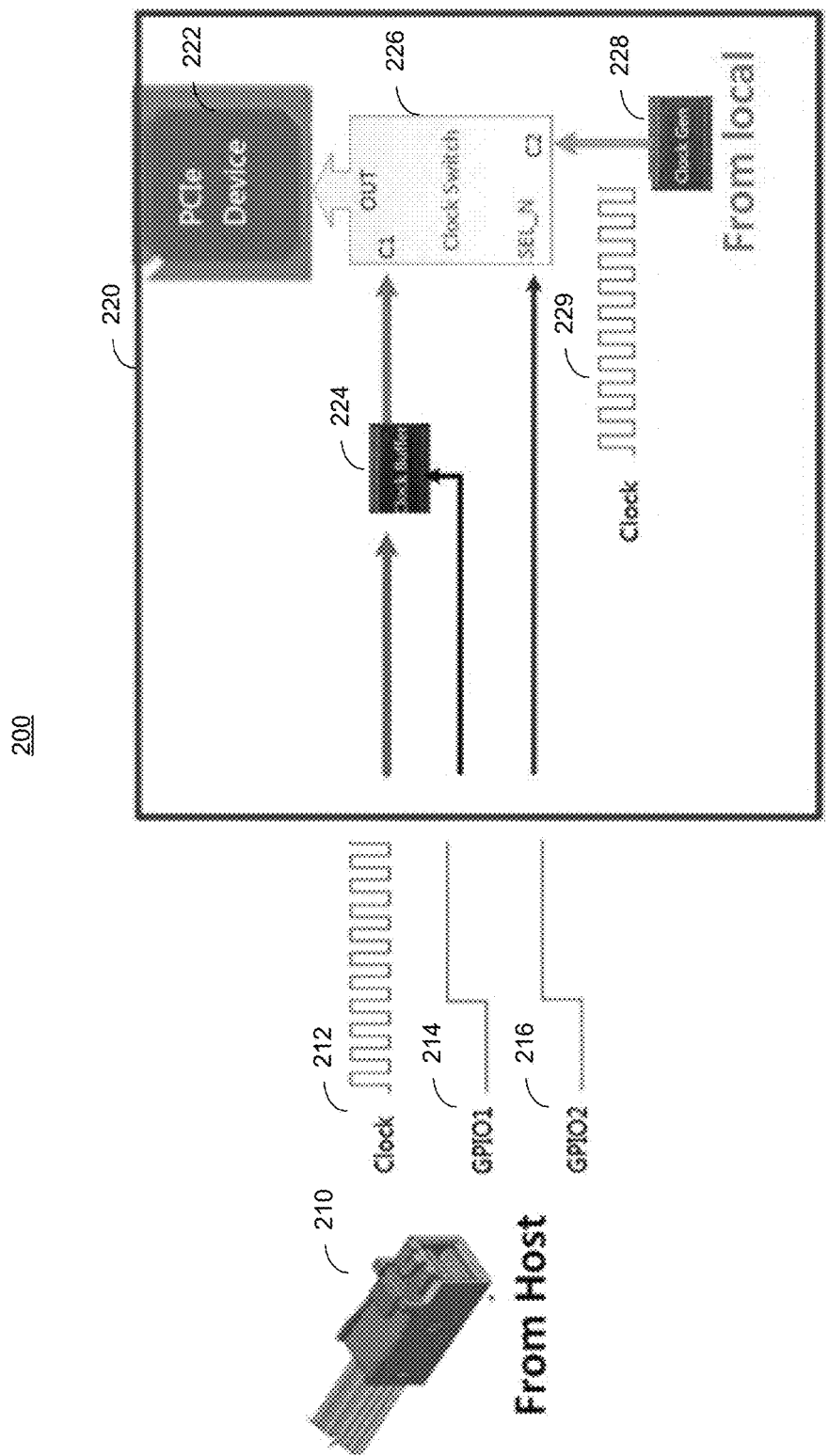
FIG. 2 illustrates a block diagram of an example automatic clock configuration system.

FIG. 2 illustrates a block diagram of an example automatic clock configuration system 200. The automatic clock configuration system 200 includes a cable 210 from a host connected to a peripheral module 220.

The cable 210 from the host sends indicator signals over a second GPIO 216 and a first GPIO 214. The first GPIO 214 is used to indicate whether the host supports SRIS mode. If the host does not support SRIS, the second GPIO 216 is used to further indicate whether the host supports SSC mode. If the host does not support SRIS, the cable 210 carries a reference clock signal 212.

The peripheral module 220 includes a peripheral device 222, a clock switch 226, a local clock generator 228, and a clock buffer 224. The local clock generator 228 is a circuit that produces a local clock signal 229 for use in synchronizing the peripheral device's operation. The local clock generator 228 includes a resonant circuit and an amplifier. The resonant circuit is usually a quartz piezo-electric oscillator, although simpler circuits may be used. The amplifier circuit usually inverts the signal from the oscillator and feeds a portion back into the oscillator to maintain oscillation. The generator may have additional sections to modify the basic clock signal to form the local clock signal 229.

The clock switch 226 includes a multiplexer to select a clock input (i.e., either the reference clock signal 212 or the local clock signal 228) for use by the peripheral device 222, based on the first GPIO 214, which indicates whether the host supports SRIS mode. A multiplexer is a device that selects one of several analog or digital input signals and forwards the selected input into a single output. A multiplexer can be considered as a multiple-input, single-output switch. A multiplexer makes it possible for several signals to share one device or resource.

If the host supports SRIS mode, the first GPIO 214 indicates to the clock switch 226 to use the local clock signal 228. Otherwise, the first GPIO 214 indicates to the clock switch 226 to use the reference clock signal 212.

If the host does not support SRIS mode, the clock buffer 224 formats the reference clock signal 212 with a bypass mode if the host supports SSC or with a phase-locked loop (PLL) mode if the host does not support SSC mode, based on the indication from the second GPIO 214. PLLs are widely employed in radio, telecommunications, computers and other electronic applications. PLLs can be used to demodulate a signal, recover a signal from a noisy communication channel, generate a stable frequency at multiples of an input frequency (frequency synthesis), or distribute precisely timed clock pulses in digital logic circuits such as microprocessors.

Figure 3:
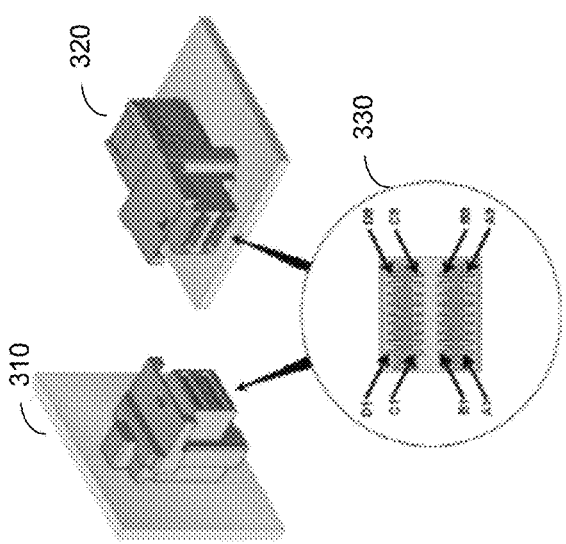
FIG. 3 illustrates a pin definition of an example peripheral interface.

FIG. 3 illustrates a pin definition of an example peripheral interface 300. A cable 330 is configured to allow communication between the host 310 and the peripheral devices 320. For example, the cable 330 can be a Serial Attached Small Computer System Interface (SAS), miniSAS, or mini-SAS HD (SFF-8643) cable. The cable 330 is able to carry PCIe data and a reference clock signal. The cable 330 also includes a number of general-purpose input/output (GPIO) pins.

The table 332 lists pins for the miniSAS HD (SFF-8643) cable. For example, table cells labeled N/C can be used as GPIOs (i.e., first GPIO 214 or second GIPIO 216).

Figure 4:
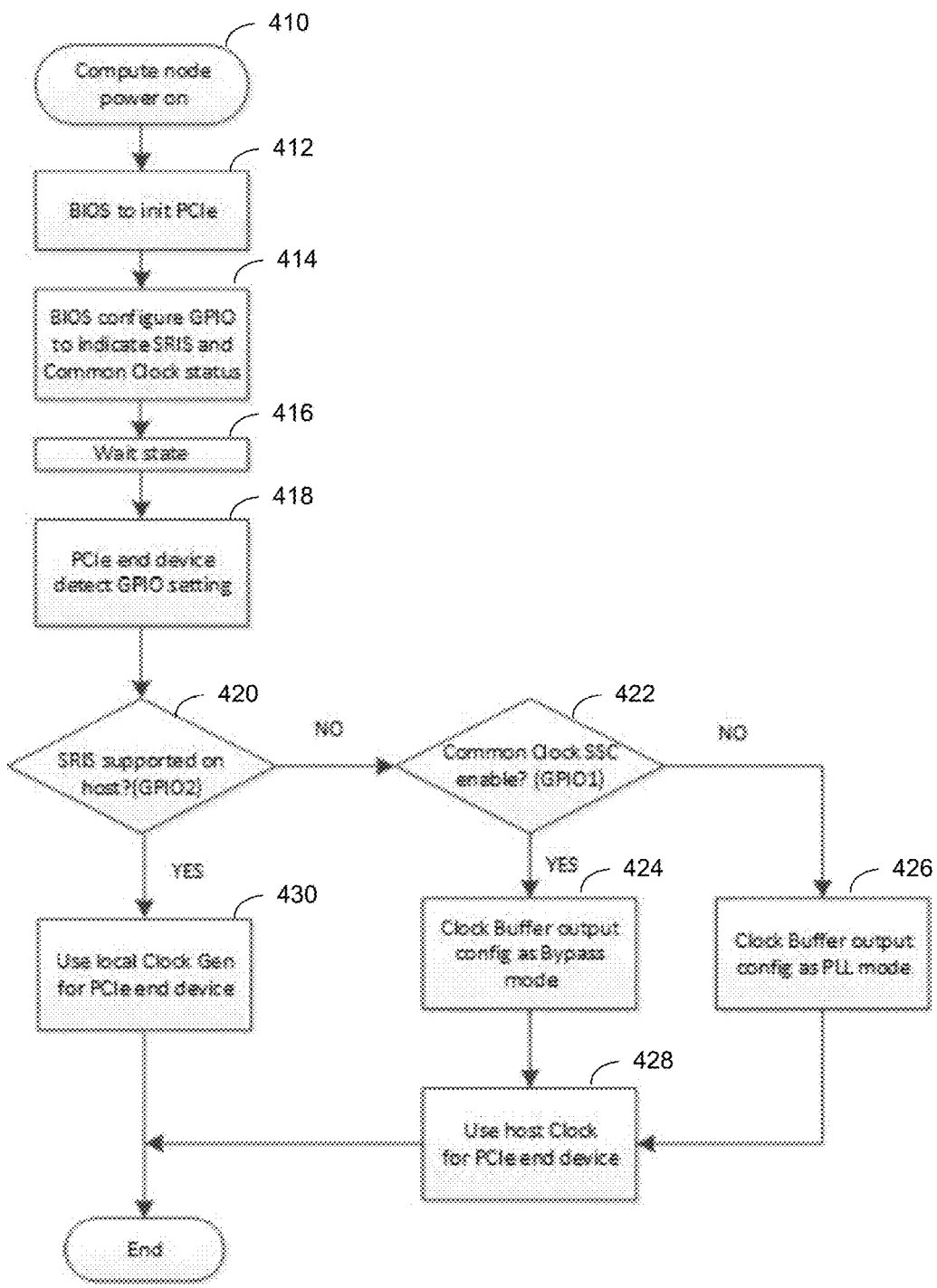
FIG. 4 illustrates an example flow chart for automatic clock configurations of a peripheral device.

FIG. 4 illustrates an example flow chart 400 for automatic clock configurations of a peripheral device. At step 410, a host is powered on. The host can refer to a computer system or a host controller (e.g., a PCIe controller) of a computer system.

At step 412, a Basic Input/Output System (BIOS) initiates a host controller (e.g., a PCIe controller). A BIOS software program is stored on a BIOS chip located on a motherboard of the server. The BIOS stores firmware executed when the computer system is first powered on. The BIOS typically recognizes, initializes, and tests hardware present in a given computing system. The BIOS then gives control of the computer system to an operating system (OS).

The BIOS begins POST whenever the server is powered on (i.e., boot up) or reset (i.e., reboot). The POST process can verify and test functionality of various hardware components such as central processing unit (CPU) registers, hard disk drives, optical reading devices, cooling devices, memory modules, expansion cards and the like. The BIOS also prepares a system environment required for running an OS. For example, the BIOS can address and allocate an area in the memory to store the OS. The BIOS can then give control of the computer system to the OS.

At step 414, the BIOS configures the host controller to indicate whether the host controller supports SRIS mode on a first GPIO pin of a cable between the host and the peripheral device. The BIOS also configures the host controller to indicate whether the host controller supports SSC mode on a second GPIO pin of the cable.

At step 416, the peripheral device is waiting for the indication on the first GPIO pin of the cable of whether the host controller supports SRIS mode. At step 418, the peripheral device detects the indication on the first GPIO pin of the cable. At step 420, the peripheral device determines whether the host controller supports SRIS mode.

If the host controller support SRIS mode, at step 430, the peripheral device uses a local clock signal from a local clock generator.

If the host controller does not support SRIS mode, at step 422, the peripheral device determines, from the second GPIO pin of the cable, whether the host controller supports SSC mode.

If the host controller supports SSC mode, at step 424, the peripheral device configures a clock buffer to format a reference clock signal from the host with a bypass mode.

If the host controller does not support SSC mode, at step 426, the peripheral device configures the clock buffer to format the reference clock signal from the host with a PLL mode.

At step 428, the peripheral device uses the reference clock signal from the host controller that has been formatted by the clock buffer.

FIG. 5 illustrates an example methodology 500 for automatic clock configurations of a peripheral device. At step 510 a peripheral device receives on a first general-purpose input/output (GPIO) of a peripheral device connecting the host and the peripheral device, whether a host supports the first clock configuration.

At step 520, the peripheral device selecting, in response to the host supporting the first clock configuration, use of a local clock of the peripheral device.

At step 530, the peripheral device selects, in response to the host not supporting the first clock configuration, use of a common clock of the host.

At optional step 540, the peripheral device receives, from the host on a second GPIO of the peripheral interface, whether the host supports a second clock configuration.

At optional step 550, the peripheral device selects, in response to the host supporting Common Clock SSC (i.e. the second clock configuration), clock buffer bypass mode.

At optional step 560, the peripheral device selects, in response to the host not supporting Common Clock SSC, clock buffer phase-locked loop (PLL) mode.

Figure 6:
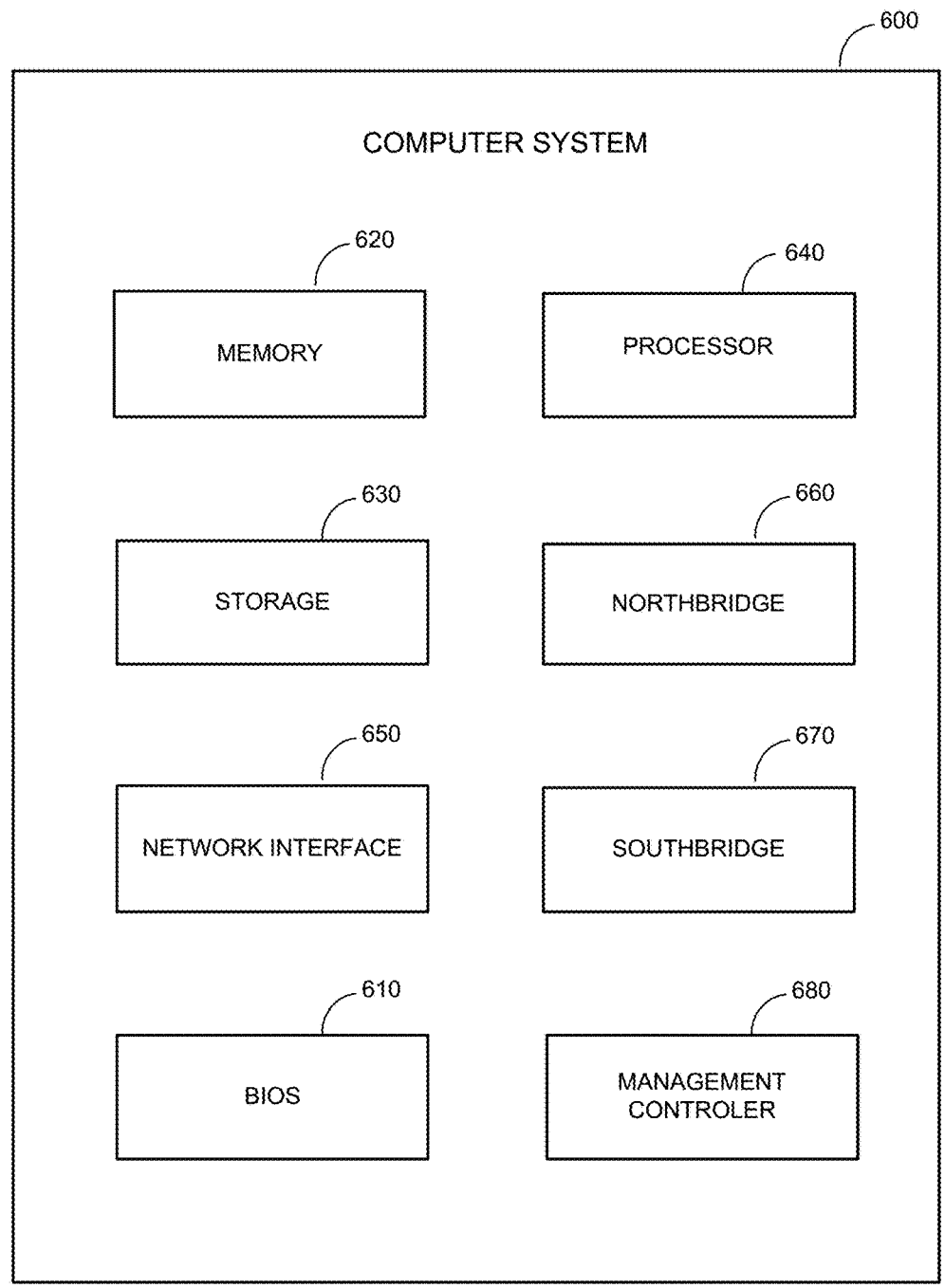
FIG. 6 illustrates a block diagram of an example computer system.

FIG. 6 illustrates a block diagram of an example computer system 600. A computer system of the subject disclosure can be any of various central processing unit (CPU) architectures such as x86, Acorn RISC Machine (ARM), Microprocessor without Interlocked Pipeline Stages (MIPS), etc. The example computer system 600 has an x86 CPU architecture. The computer system 600 includes a processor 640, a network interface 650, a management controller 680, a memory 620, a storage 630, a BIOS 610, a northbridge 660, and a southbridge 670.

The computer system 600 is, for example, a server (e.g., a server in a server rack of a data center) or a personal computer. The processor (e.g., central processing unit (CPU)) 640 is a chip on a motherboard that retrieves and executes programming instructions stored in the memory 620. The processor 640 is a single CPU with a single processing core, a single CPU with multiple processing cores, or multiple CPUs. One or more buses (not shown) transmit instructions and application data between various computer components such as the processor 640, memory 620, storage 630, and networking interface 650.

The memory 620 includes any physical device used to temporarily or permanently store data or programs, such as various forms of random-access memory (RAM). The storage 630 includes any physical device for non-volatile data storage such as a HDD or a flash drive. The storage 630 can have a greater capacity than the memory 620 and can be more economical per unit of storage, but can also have slower transfer rates.

The BIOS 610 includes a Basic Input/Output System or its successors or equivalents, such as an Extensible Firmware Interface (EFI) or Unified Extensible Firmware Interface (UEFI). The BIOS 610 includes a BIOS chip located on a motherboard of the computer system 600 storing a BIOS software program. The BIOS 610 stores firmware executed when the computer system is first powered on along with a set of configurations specified for the BIOS 610. The BIOS firmware and BIOS configurations are stored in a non-volatile memory (e.g., NVRAM) or a ROM such as flash memory. Flash memory is a non-volatile computer storage medium that can be electronically erased and reprogrammed.

The BIOS 610 is loaded and executed as a sequence program each time the computer system 600 is started. The BIOS 610 recognizes, initializes, and tests hardware present in a given computing system based on the set of configurations. The BIOS 610 performs self-test, such as a Power-on-Self-Test (POST), on the computer system 600. This self-test tests functionality of various hardware components such as hard disk drives, optical reading devices, cooling devices, memory modules, expansion cards and the like. The BIOS addresses and allocates an area in the memory 620 in to store an operating system. The BIOS 610 then gives control of the computer system to the OS.

The BIOS 610 of the computer system 600 includes a BIOS configuration that defines how the BIOS 610 controls various hardware components in the computer system 600. The BIOS configuration determines the order in which the various hardware components in the computer system 600 are started. The BIOS 610 provides an interface (e.g., BIOS setup utility) that allows a variety of different parameters to be set, which can be different from parameters in a BIOS default configuration. For example, a user (e.g., an administrator) can use the BIOS 610 to specify clock and bus speeds, specify what peripherals are attached to the computer system, specify monitoring of health (e.g., fan speeds and CPU temperature limits), and specify a variety of other parameters that affect overall performance and power usage of the computer system.

The management controller 680 is a specialized microcontroller embedded on the motherboard of the computer system. For example, the management controller 680 is a baseboard management controller (BMC). The management controller 680 manages the interface between system management software and platform hardware. Different types of sensors built into the computer system report to the management controller 680 on parameters such as temperature, cooling fan speeds, power status, operating system status, etc. The management controller 680 monitors the sensors and has the ability to send alerts to an administrator via the network interface 650 if any of the parameters do not stay within preset limits, indicating a potential failure of the system. The administrator can remotely communicate with the management controller 680 to take some corrective action such as resetting or power cycling the system to restore functionality.

The northbridge 660 is a chip on the motherboard that can be directly connected to the processor 640 or is integrated into the processor 640. In some instances, the northbridge 660 and the southbridge 670 is combined into a single die. The northbridge 660 and the southbridge 670, manage communications between the processor 640 and other parts of the motherboard. The northbridge 660 manages tasks that require higher performance than the southbridge 670. The northbridge 660 manages communications between the processor 640, the memory 620, and video controllers (not shown). In some instances, the northbridge 660 includes a video controller.

The southbridge 670 is a chip on the motherboard connected to the northbridge 660, but unlike the northbridge 660, need not be directly connected to the processor 640. The southbridge 670 manages input/output functions, such as Universal Serial Bus (USB), audio, serial, BIOS, Serial Advanced Technology Attachment (SATA), Peripheral Component Interconnect (PCI) bus, PCI eXtended (PCI-X) bus, PCI Express bus, ISA bus, SPI bus, eSPI bus, SMBus, of the computer system 600. The southbridge 670 connects to or includes within the southbridge 670 the management controller 670, Direct Memory Access (DMAs) controllers, Programmable Interrupt Controllers (PICs), and a real-time clock. In some instances, the southbridge 670 directly connects to the processor 640, such as in the case where the northbridge 660 is integrated into the processor 640.

The networking interface 650 is any interface that supports wired or wireless Local Area Networks (LANs) or Wide Area Networks (WANs), such as Ethernet, Fibre Channel, Wi-Fi, Bluetooth, Firewire, the Internet, etc. For example, the networking interface 650 can include a network interface controller (NIC) for Ethernet. Ethernet has been the most widely used networking standard for connecting computers in both Local Area Networks (LANs) and Wide Area Networks (WANs). Ethernet defines a number of wiring and signaling standards for the physical layer (PHY), through means of network access at the Media Access Control (MAC)/Data Link Layer, and through a common addressing format. Ethernet enabled devices typically communicate by transmitting data packets, which includes blocks of data that are individually sent and delivered.

The various illustrative logical blocks, modules, and circuits described in connection with the disclosure herein can be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor is a microprocessor, or in the alternative, any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

The operations of a method or algorithm described in connection with the disclosure herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor reads information from, and write information to, the storage medium. In the alternative, the storage medium is integral to the processor. The processor and the storage medium resides in an ASIC. The ASIC resides in a user terminal. In the alternative, the processor and the storage medium resides as discrete components in a user terminal.

In one or more exemplary designs, the functions described is implemented in hardware, software, firmware, or any combination thereof. If implemented in software, the functions are stored on or transmitted over as one or more instructions or code on a non-transitory computer-readable medium. Non-transitory computer-readable media includes both computer storage media and communication media including any medium that facilitates transfer of a computer program from one place to another. A storage media is any available media that can be accessed by a general purpose or special purpose computer. By way of example, and not limitation, such computer-readable media includes RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Disk and disc, as used herein, includes compact disc (CD), laser disc, optical disc, digital versatile disc (DVD), floppy disk and blue ray disc where disks usually reproduce data magnetically, while discs reproduce data optically with lasers. Combinations of the above should also be included within the scope of non-transitory computer-readable media.

The previous description of the disclosure is provided to enable any person skilled in the art to make or use the disclosure. Various modifications to the disclosure will be readily apparent to those skilled in the art, and the generic principles defined herein can be applied to other variations without departing from the scope of the disclosure. Thus, the disclosure is not intended to be limited to the examples and designs described herein, but is to be accorded the widest scope consistent with the principles and novel features disclosed herein.

The invention claimed is:

1. A method for automatic clock configurations, by a peripheral device, comprising:
   receiving, from a host on a first general-purpose input/output (GPIO) of a peripheral interface connecting the host and the peripheral device, whether the host supports the first clock configuration;
   selecting, in response to the host supporting the first clock configuration, use of a local clock of the peripheral device;
   selecting, in response to the host not supporting the first clock configuration, use of a common clock of the host;
   receiving, from the host on a second GPIO of the peripheral interface, whether the host supports a second clock configuration; and
   formatting a reference clock signal with a bypass mode if the host supports the second clock configuration, or with a phase-locked loop (PLL) mode if the host does not support SSC mode, based upon an indication of the second GPIO.

2. The method of claim 1, wherein the first GPIO is configured by a Basic Input/Output System (BIOS) of the host.

3. The method of claim 1, wherein the first clock configuration is Separate Reference Clock Independent Spread (SRIS).

4. The method of claim 1, further comprising selecting, in response to the host supporting Common Clock SSC, clock buffer bypass mode.

5. The method of claim 1, further comprising selecting, in response to the host not supporting Common Clock SSC, clock buffer phase-locked loop (PLL) mode.

6. The method of claim 1, wherein the peripheral interface is one of a Serial Attached Small Computer System Interface (SAS), mini SAS, or mini SAS HD.

7. A system for automatic clock configurations, comprising:
   a host;
   a peripheral device; and
   a peripheral interface connecting the host and the peripheral device having a first general-purpose input/output (GPIO) and a second GPIO,
   wherein the host is configured to indicate on the first GPIO whether the host supports a first clock configuration, wherein the first clock configuration is Separate Reference Clock Independent Spread (SRIS), and
   wherein the peripheral device is configured to:
      select, in response to the host supporting the first clock configuration, use of a local clock of the peripheral device; and
      select, in response to the host not supporting the first clock configuration, use of a common clock of the host;
   wherein the host is further configured to indicate on the second GPIO of the peripheral interface, whether the host supports a second clock configuration.

8. The system of claim 7, wherein the first GPIO is configured by a Basic Input/Output System (BIOS) of the host.

9. The system of claim 7, wherein the second clock configuration is Common Clock Spread-Spectrum Clocking (SSC).

10. The system of claim 9, wherein the peripheral device is further configured to select, in response to the host supporting Common Clock SSC, clock buffer bypass mode.

11. The system of claim 9, wherein the peripheral device is further configured to select, in response to the host not supporting Common Clock SSC, clock buffer phase-locked loop (PLL) mode.

12. The system of claim 8, wherein the peripheral interface is one of a Serial Attached Small Computer System Interface (SAS), mini SAS, or mini SAS HD.

13. A method for automatic clock configurations, by a peripheral device, comprising:
receiving, from a host on a first general-purpose input/output (GPIO) of a peripheral interface connecting the host and the peripheral device, whether the host supports the first clock configuration, wherein the first clock configuration is Separate Reference Clock Independent Spread (SRIS);
selecting, in response to the host supporting the first clock configuration, use of a local clock of the peripheral device; and
selecting, in response to the host not supporting the first clock configuration, use of a common clock of the host;
wherein the host is further configured to indicate on the second GPIO of the peripheral interface, whether the host supports a second clock configuration.

14. The method of claim 13, wherein the first GPIO is configured by a Basic Input/Output System (BIOS) of the host.

15. The method of claim 13, wherein the second clock configuration is Common Clock Spread-Spectrum Clocking (SSC).

16. The method of claim 15, further comprising selecting, in response to the host supporting Common Clock SSC, clock buffer bypass mode.

17. The method of claim 15, further comprising selecting, in response to the host not supporting Common Clock SSC, clock buffer phase-locked loop (PLL) mode.

18. The method of claim 13, wherein the peripheral interface is one of a Serial Attached Small Computer System Interface (SAS), miniSAS, or mini SAS HD.

* * * * *